United States Patent Office 3,817,723
Patented June 18, 1974

3,817,723
TWO-STAGE GASIFICATION OF PRETREATED COAL
Ernest E. Donath, St. Croix, Virgin Islands, assignor to the United States of America as represented by the Secretary of the Interior
Filed Mar. 23, 1972, Ser. No. 237,332
Int. Cl. C10j 3/16, 3/60
U.S. Cl. 48—197 R
12 Claims

ABSTRACT OF THE DISCLOSURE

A process for the pretreatment of coal and similar solids for two-stage gasification for the production of a methane rich gas. The coal is pretreated by reacting a bed of fluidized coal, or a slurry of coal and recycled oils, with a hydrogen rich product gas at temperatures much lower than those required for hydrogasification. The pretreated coal is mixed with steam and reacted in a second gasification stage with synthesis gas produced in the first gasification stage. The reaction in the second stage produces char entrained in a hydrogen rich product gas containing methane, which product gas is separated from the char and is passed through purification reactions and methanated to produce a methane rich gas. The separated char is recycled to the first stage and reacted with steam and oxygen to produce the synthesis gas for the second stage. Temperatures in the first stage exceed 2,500° F. and temperatures in the second stage exceed 1,600° F., with the pressure in both stages maintained in excess of 50 atmospheres. The coal pretreatment is conducted in a single stage or in multiple stages.

BACKGROUND OF THE INVENTION

(1) Field of the invention

This invention relates to a process for the treatment, with a hydrogen rich gas, of coal reacted in a two-stage gasification process, at high temperatures and high pressures, for the production of a methane rich gas.

(2) Description of the prior art

Methane rich fuel gas is produced by a two stage gasification process wherein particulate coal and steam are reacted in the second stage with synthesis gas from the first stage at temperatures in excess of 1,600° F. and pressures in excess of 50 atmospheres to produce char and a product gas containing hydrogen, methane and oxides of carbon. The char and product gas are withdrawn and separated and the product is thereafter treated to remove carbon oxides and other diluents and is ultimately methanated to produce a methane rich fuel gas. The char is recycled to the first gasification stage for reaction with steam and oxygen at temperatures in excess of 2,500° F. and pressures in excess of 50 atmospheres to produce a synthesis gas containing hydrogen and oxides of carbon for reaction in the second gasification stage. A portion of the char, which has low sulfur content, can be burned to produce process energy. Ash produced from the reactions in the first and second stages gravitates to the lower sections of the reactor in stage one where the ash is cooled and removed from the process.

The two-stage gasification process described above was developed at Bituminous Coal Research, Inc., at Pittsburgh, Pennsylvania (BCR). The process is described in a publication of the Department of Interior, Office of Coal Research (OCR), dated 1965 and entitled, "Gas Generator-Research and Development Survey and Evaluation." That process was described also in a computer study entitled, "Computer Study of Stage Two Reactions in the BCR Two Stage Super Pressure Gasification Process," presented at the national meeting of the American Chemical Society, Division of Fuel Chemistry, Chicago, Illinois, in September 1967.

SUMMARY OF THE INVENTION

This invention resides in a process for pretreating coal and other carbonaceous solids reacted in a two-stage gasification reactor to produce methane rich fuel gas. The feed coal is reacted with hot fluidizing hydrogen rich product gas from the second stage of the gasification reactor at temperatures within the range of from 600 to 950° F. and at a pressure in excess of the pressure in the second stage of the gasification reactor. Treated coal and the volatilized constituents from the pretreated coal are mixed with steam and injected into the second stage of the gasification reactor to react with synthesis gas from the first gasification stage at temperatures in excess of 1,600° F. and pressures in excess of 50 atmospheres to produce char entrained in a product gas containing hydrogen and carbon oxides. The product gas is separated and treated to remove the carbon oxides and other impurities and is ultimately methanated to produce a methane rich fuel gas. The char is separated and recycled to the first gasification stage for reaction with steam and oxygen at temperatures in excess of 2,500° F. and pressures in excess of 50 atmospheres to produce a synthesis gas containing hydrogen and carbon oxides for reaction in the second gasification stage. The pressures, temperatures, and residence times of the reactants in each of the pretreatment stage and the first and second gasification stages are controlled to prevent coal agglomeration in the pretreatment stage, to assure rapid reaction of coal above its range of plasticity in the second stage, and to assure rapid gasification of char above the melting temperature of char ash in the first stage.

Pretreatment of process coal with a product gas according to the method of this invention substantially increases the methane yield and reduces the oxygen requirements in reactions of coal with synthesis gas of the two stage gasification process.

DESCRIPTION OF THE PREFERRED EMBODIMENTS

In this specification, the term "coal" means any carbonaceous material including all ranks of coal, lignite, and the like.

The term "gasification" means the heating of coal in the presence of reacting agents, whereby all or part of the volatile portion of the coal is liberated and the carbon in residual char is reacted with those reacting agents or with other reactants present in the gasification process.

The term "product gas" means a methane containing gas such as the gas produced in the second stage of the two stage gasification process described herein.

Throughout the specification similar apparatus will be, for convenience, designated by similar numerals.

SINGLE STAGE COAL PRETREATMENT

Figure 1:
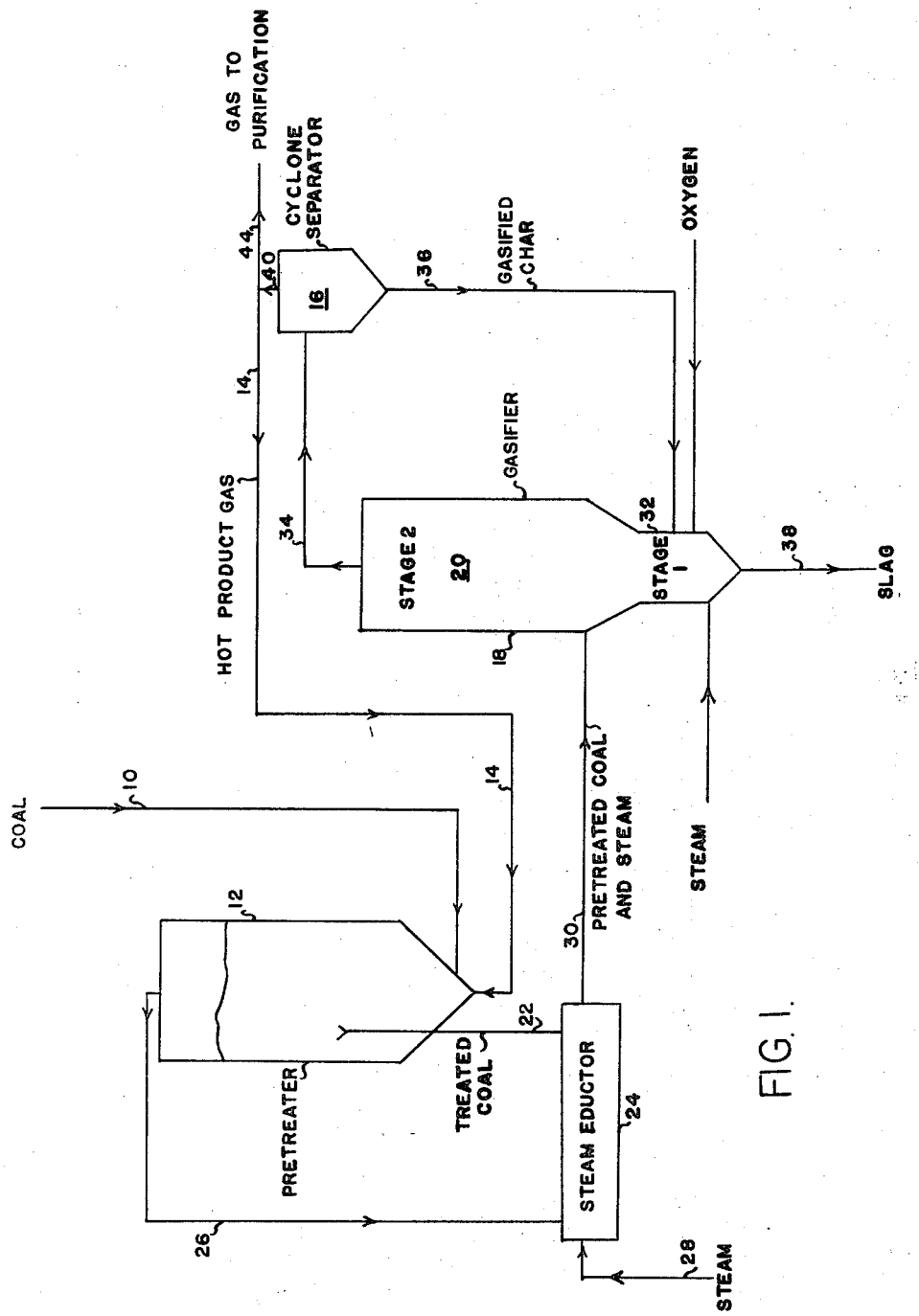
FIG. 1 is a digrammatic illustration of apparatus used in the process of this invention wherein a fluidized bed of coal and product gas are reacted in a single pretreatment stage.

In the single stage pretreatment process shown in FIG. 1, coal is pulverized to substantially minus 100 mesh and fed through conduit 10 to a pretreating reactor vessel 12 wherein the coal is fluidized and reacted with hot product gas conveyed through conduit 14 from a cyclone separator 16 and introduced into the bottom of reactor vessel 12. Pretreatment with a hydrogen-rich gas is desirable and use of product gas is preferred because such product gas exhibits a high degree of compatibility with the process system. A preferred pretreatment gas is one in which 50% by volume or more of the gas has a hydrogen content of at least 80% by volume.

The coal pretreatment in reactor vessel 12 is conducted at pressures preferably slightly greater than the presure in the upper portion 18 of a gasification vessel generally designated by the numeral 20 to permit feeding of treated coal and other reactants into the gasification vessel 20 without pumps or other devices. The coal pretreatment in reactor vessel 12 is conducted at temperatures within the range of from 600° F. to 950° F., which temperatures are substantially lower than the temperatures required in the hydrogasification reaction wherein coal is converted directly into methane by reaction with hydrogen. In the conditions of the pretreater reactor vessel 12, the product gas should exhibit a minimum hydrogen partial pressure, greater than 300 p.s.i.g., and hydrogen partial pressures in the range of 500 p.s.i.g., or above, are preferred. Residence times of the coal in pretreater vessel 12, at the conditions of temperature and pressure therein, are between five and sixty minutes. Pretreater feed ratios of between eight and seventy standard cubic feet of product gas per pound of feed coal can be used and ratios of from fifteen to fifty standard cubic feet of product gas per pound of feed coal are preferred. The operating temperatures and pressures and the residence times in pretreater reactor vessel 12 are adjusted and maintained to assure that the coal therein does not soften or agglomerate during the process.

The treated coal is withdrawn from pretreater 12 through conduit 22 and introduced into a steam eductor 24. The volatilized constituents of the treated coal and the product gas are withdrawn from pretreater reactor vessel 12 through conduit 26 and conveyed to the steam eductor 24. Steam is introduced through conduit 28 into eductor 24 where the product gas, volatile constituents and treated coal are mixed with the steam and the mixture is introduced into conduit 30 and conveyed to the upper portion 18 of gasification vessel 20 as a reactant in the second stage of the gasification process.

The pretreated coal, steam and volatile constituents in conduit 30 are injected into the upper portion 18 of the vessel 20 at a pressure in excess of 50 atmospheres and reacted therein with synthesis gas product from the first gasification stage that takes place in the gasification vessel lower portion 32. The reaction in the second stage of the gasification process is conducted at a temperature in excess of 1,600° F. and a pressure in excess of 50 atmospheres with residence times for the reactants in the second stage portion of the vessel 20 maintained to assure rapid mixing and reaction of the coal at a temperature above the range of coal plasticity.

The product of the reaction in the second stage comprises a low sulfur char entrained in a product gas containing methane, hydrogen and carbon oxides which are withdrawn from the upper portion of the vessel 20 and fed through conduit 34 into cyclone separator 16.

The partially gasified char separated in cyclone 16 is fed through conduit 36 into the lower portion 32 of gasifier vessel 20 as a reactant in the first stage of the gasification process. Steam and oxygen are introduced through suitable conduits into the vessel lower portion 32 and are reacted with char in the first stage of the gasification process to produce a synthesis gas containing hydrogen and carbon oxides which flow upwardly through gasified vessel 20 for reaction in the upper portion 18 as the second stage of the gasification process. The reaction in the first stage is conducted at temperatures in excess of 2,500° F. and at a pressure in excess of 50 atmospheres with the reactants in the first stage maintained at a ratio adjusted to assure rapid gasification of char in the first stage at temperatures above the melting point of the char ash.

Residence times of the reactants in each of the first and second stages should be maintained at less than 15 seconds respectively. Preferably, residence time of gases in the second stage should be les than ten seconds and residence time of gases in the first stage preferably less than four seconds.

The slag formed in gasifier vessel 20 is in a molten state because of the elevated temperature of the process and gravitates through gasifier vessel 20 to the bottom thereof where the molten slag is cooled and withdrawn through conduit 38.

Part of the product gas withdrawn from cyclone 16 through conduit 40 is conveyed through conduit 14 to the pretreater reactor vessel 12 for treatment of the coal therein. The remaining product gas withdrawn from cyclone 16 is conducted through conduit 44 to a product gas purification unit wherein the product gas is treated in a water gas shift reactor to adjust the hydrogen to carbon monoxide ratio of approximately 3.0 to 1.0, and preferably to a ratio of 3.05 to 1.0. The product gas from the water gas shift reactor is then conducted to a carbon dioxide removal unit and a hydrogen sulfide removal unit (not shown in the drawing) for further purification. Ultimately, the purified product gas is methanated catalytically to react the remaining hydrogen and carbon monoxide in the product gas to form a fuel gas containing more than 70% methane by volume and preferably more than 90% methane by volume.

TWO-STAGE COAL PRETREATMENT

Figure 2:
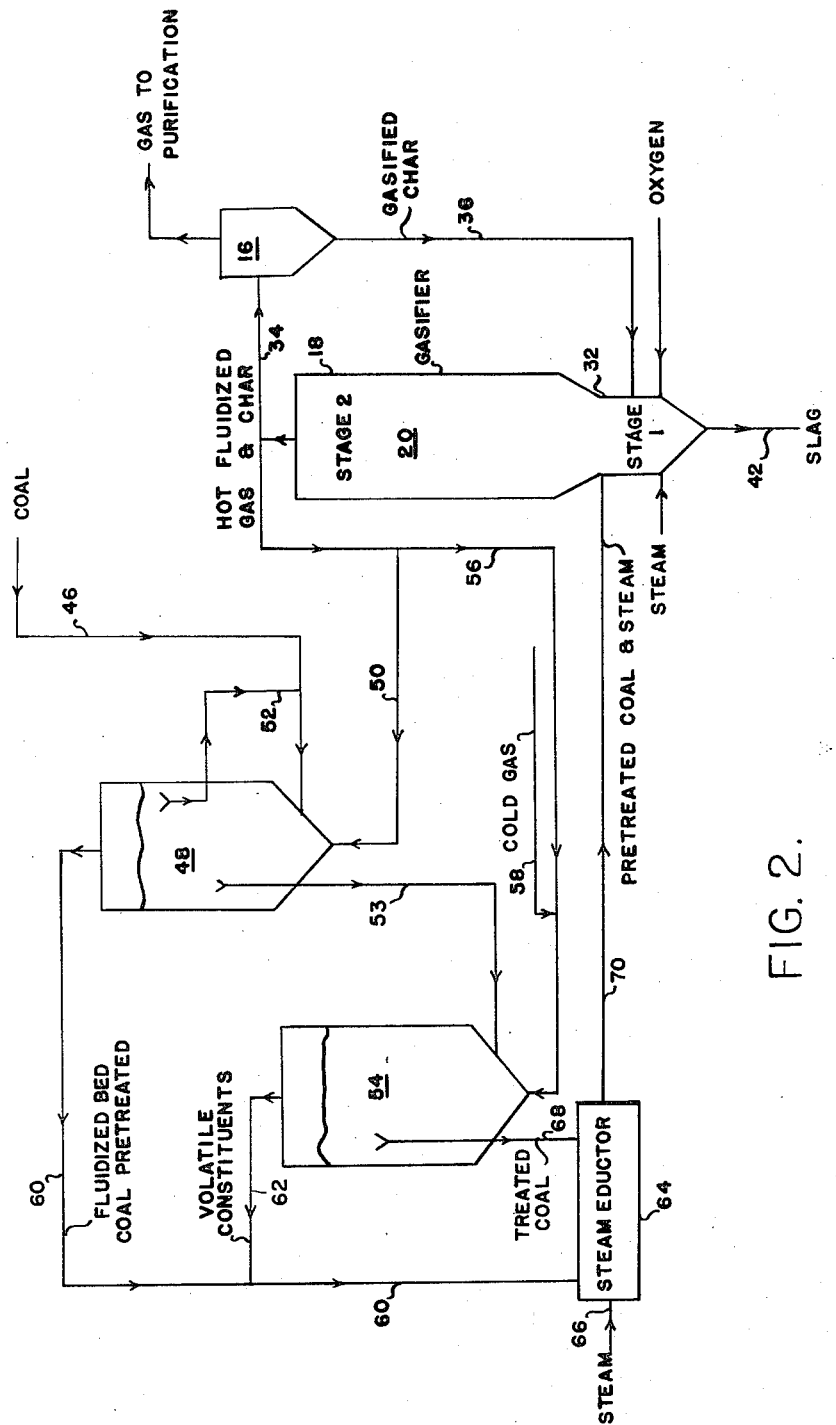
FIG. 2 is a diagrammatic illustration of apparatus used in the process of this invention wherein coal is pretreated with product gas in two separate stages at successively higher temperatures.

FIG. 2 illustrates a two-stage coal pretreatment process adapted for use with coals that tend to agglomerate at temperatures below the most suitable pretreating temperature. The coal, without preheating, is conducted through conduit 46 to a first pretreater vessel 48 wherein the coal is reacted with a mixture of hot product gas and partially gasified char introduced into the pretreater vessel 48 through conduit 50. The pretreating reaction in the first pretreater vessel 48 is conducted at a temperature of approximately 730° F. with a residence time for the coal therein of approximately 20 minutes. The coal is raised to the temperature of the material in the first pretreater vessel 48 by mixture with char withdrawn from the first pretreater vessel 48 through conduit 52 and introduced into conduit 46 to mix with coal being conveyed therethrough. Mixing the coal with char from the pretreater raises the temperature of untreated coal and also dilutes the coal with a non-agglomerating material to prevent agglomeration during the pretreatment.

The partially hydrogenated and partially devolatilized coal in pretreater vessel 48 is withdrawn therefrom through conduit 53 and fed into a second pretreater vessel 54. Hot product gas and partially gasified char are mixed in conduit 56 with cold gas introduced through conduit 58 into conduit 56. The cold gas may be obtained from the water gas shift reactor in the purification unit (not shown in the drawing). The fluidizing mixture of product gas and cold gas introduced into the second pretreater 54 is adjusted to maintain the reaction in the second pretreater 54 at a temperature of approximately 810° F. with a residence time for the coal in the second pretreater 54 of approximately 20 minutes. The cold gas obtained from the water gas shift reactor has an additional benefit because of its relatively high hydrogen content.

The fluidizing gas and volatilized constituents from the first pretreater 48 are conducted through conduit 60 and are combined with the fluidizing gas and volatilized constituents from second pretreater 54 conveyed through conduit 62 and the combined constituents are fed to a steam eductor or steam jet compressor 64 where they are mixed with steam from conduit 66 and ejected from eductor 64 at a pressure slightly above the pressure of the upper portion of the gasification vessel 20 and in excess of 50 atmospheres.

The pretreated coal in the second pretreater 54 is withdrawn therefrom through conduit 68 and also mixed with the steam and volatilized materials in the eductor 64 and the mixture of pretreated coal, volatilized materials and steam is fed through conduit 70 into the upper portion 18 of gasifier 20 where the second stage of the gasification process takes place.

From this point onward, the process proceeds in the same fashion as that described for the process shown in FIG. 1.

An example of the fuel gas and yield obtained with this two-stage pretreatment process can be compared with an exemplary fuel gas composition and yield obtained with a similar process without pretreatment as shown in the example of Table A. The data indicates that pretreated coal can produce fuel gas with higher methane content, which results in increased thermal efficiency of the conversion of coal into fuel gas and in much lower consumption of oxygen.

TABLE A

| | Column | |
|---|---|---|
| | 1 | 2 |
| | Pretreated coal | Two-stage gasified coal with no pre-treatment |
| Coal pretreatment | (¹) | None |
| Gas composition after shift reactor (percent by wt.): | | |
| Carbon dioxide | 32.9 | 30.6 |
| Carbon monoxide | 8.6 | 14.6 |
| Hydrogen | 26.5 | 44.5 |
| Methane | 29.7 | 8.0 |
| Nitrogen | 1.3 | 1.6 |
| Hydrogen sulfide | 1.0 | 0.7 |
| Pipeline gas after acid gas removal and methanation, (percent by wt.): | | |
| Carbon dioxide | 3.1 | 1.6 |
| Carbon monoxide | 0.0 | 0.0 |
| Hydrogen | 1.5 | 1.6 |
| Methane | 92.3 | 90.3 |
| Nitrogen | 3.1 | 6.5 |
| Heating value, B.t.u./s.c.f. | 940 | 918 |
| Oxygen consumption, s.c.f./1,000 s.c.f. methane | 215 | 760 |
| Thermal efficiency, B.t.u. in pipeline gas as percent of B.t.u. in coal | 82.1 | 75.8 |

¹ Shown in process—FIG. 2.

SELECTIVE REACTION OF SEPARATED CONDENSED VOLATILIZED LIQUIDS FROM PRETREATED COAL

Figure 3:
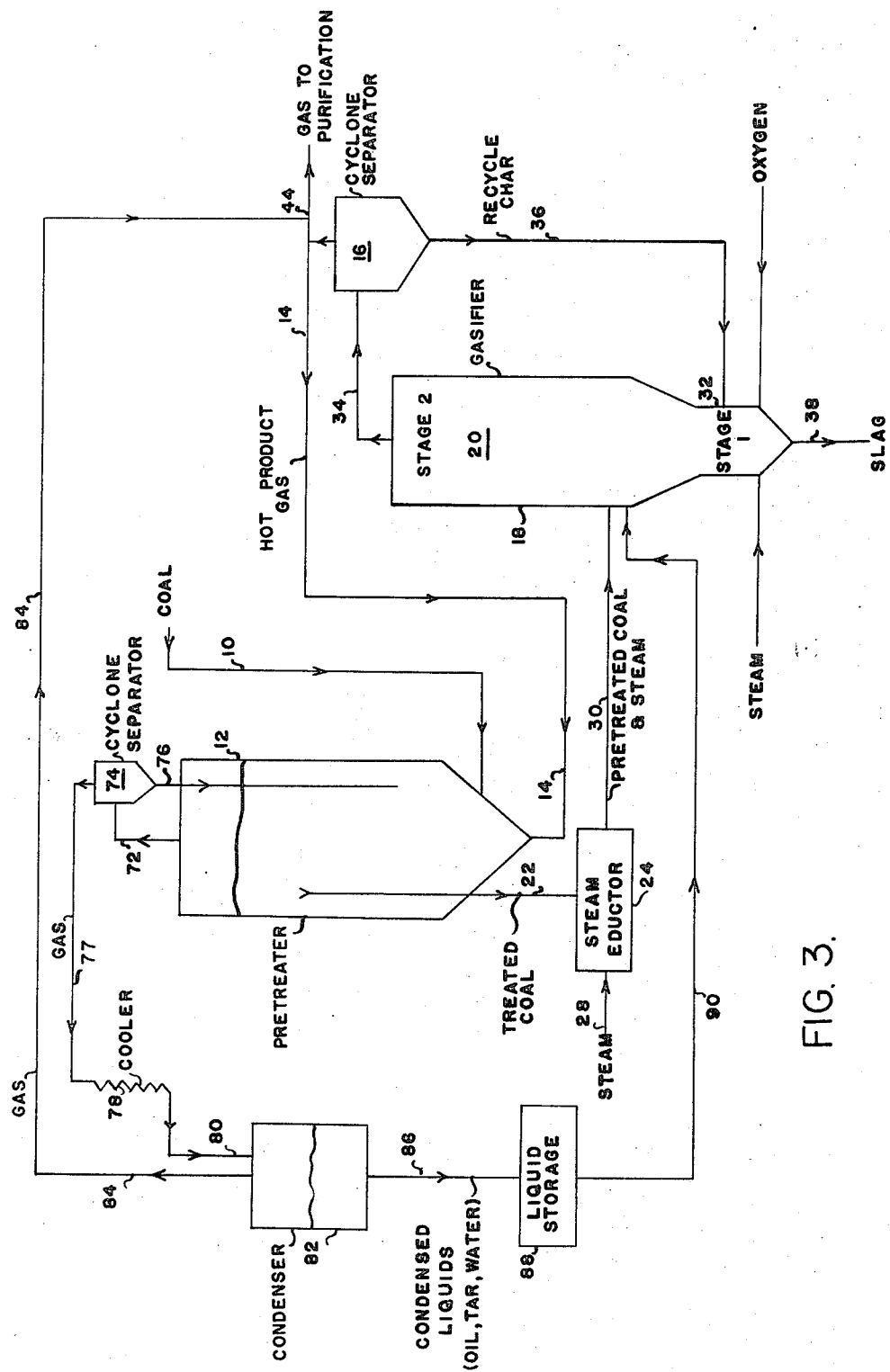
FIG. 3 is a diagrammatic illustration of apparatus for use with the process of this invention wherein condensed volatile constituents from the pretreated coal are separated from the process stream and later injected at a preselected time into the second stage gasification reaction for the enrichment of the product gas.

FIG. 3 illustrates a process of this invention, similar to the process shown in FIG. 1, wherein volatilized materials from pretreater vessel 12 are cooled to condense those portions that are liquid at or near ambient temperature and pressure, which portions of the volatilized material are removed from the process stream and stored for reaction, at a preselected time, with the pretreated coal and steam and the stage one synthesis gas in the second gasification stage portion 18 of the vessel 20.

In this process, preheated coal is fed through conduit 10 to pretreater 12 and fluidized and reacted therein with hot product gas fed to pretreater 12 through conduit 14. Similar to the process described in FIG. 1, the pretreated coal is withdrawn through conduit 22 and mixed in a steam eductor 24 with steam introduced through conduit 28 and conducted through conduit 30 to the upper portion 18 of vessel 20 where the second gasification stage takes place. The entrained volatilized materials produced in pretreater 12 are withdrawn therefrom through conduit 72 and fed to a cyclone separator 74. Solids and the heavier volatilized liquid materials are separated in cyclone 74 and conducted therefrom through conduit 76 to the pretreater 12. The gases separated in cyclone 74 are withdrawn from cyclone 74 and conducted through conduit 77 to a cooling unit 78 and thereafter conducted through conduit 80 to a condenser 82 maintained substantially at ambient temperature wherein volatilized materials condensable at ambient temperature are separated and removed from the process stream. Those volatilized materials which remain as a gas at ambient temperature are withdrawn from condenser 82 through conduit 84 and conveyed to conduit 44 where they mix with the product gas conducted to the purification unit. The remainder of the process proceeds in a fashion similar to that described for the process illustrated in FIG. 1, except that the condensed liquids in condenser 72 are removed through conduit 86 and stored in a vessel 88. The condensed liquids are injected, at a preselected time in the process, through conduit 90 into the upper portion 18 of gasification vessel 20 at a point near the point of entry of the pretreated coal and steam from the conduit 30. The condensed liquids contain tar and oil which exhibit a high gas yield and a low oxygen requirement resulting in increased gas production at particular desired times.

MULTIPLE STAGE COAL PRETREATMENT

Figure 4:
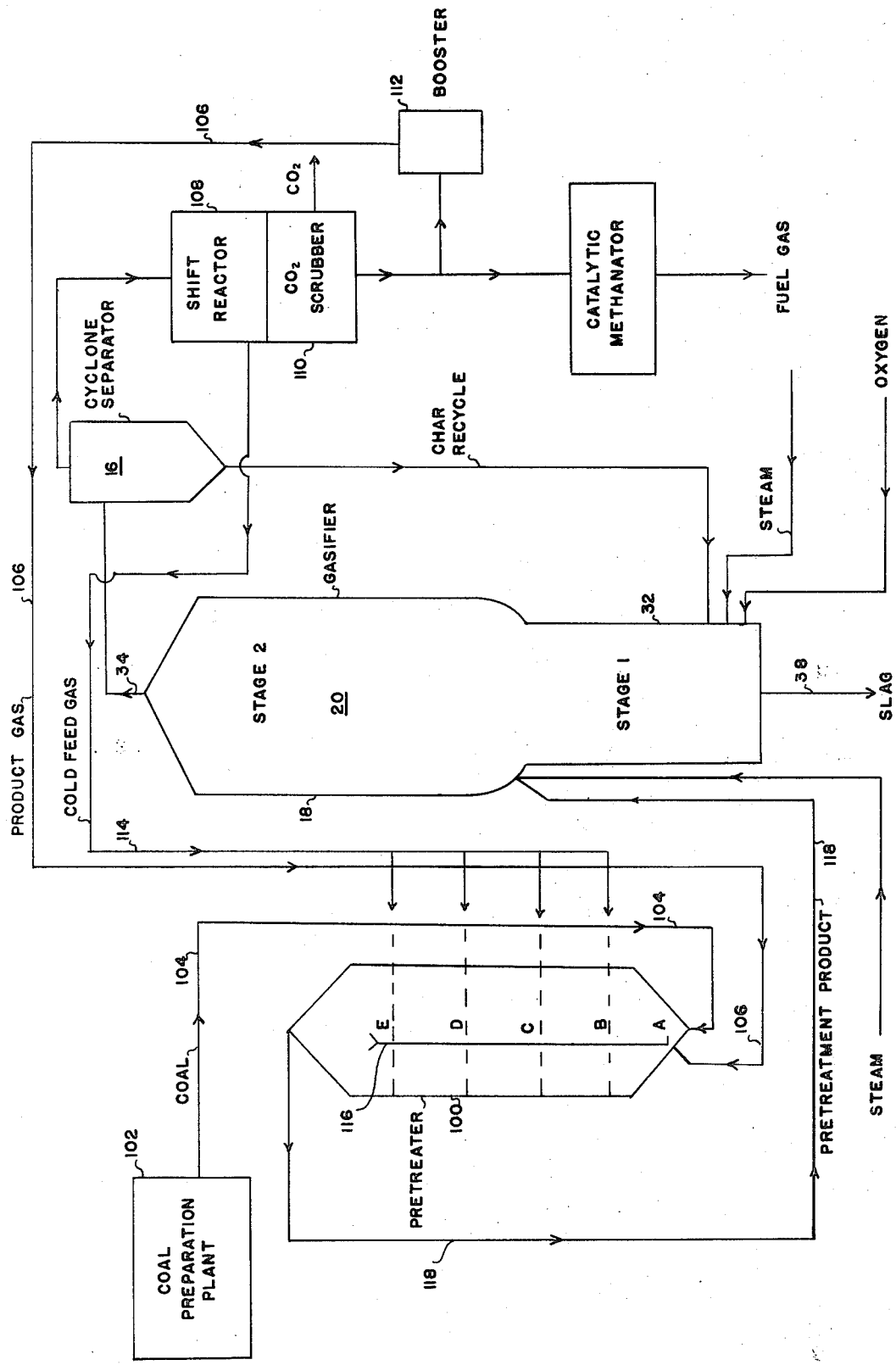
FIG. 4 is a diagrammatic illustration of apparatus for use with the process of this invention wherein pretreatment of the coal by reaction with product gas is conducted in five separate stages at succesively higher temperatures.

The process illustrated in FIG. 4 is a multiple stage coal pretreatment process particularly adapted for use with very highly fluid coals and other highly agglomerating coals. A pretreater vessel 100 includes several separate pretreatment compartments or stages, A through E. Coal from a preparation plant 102 is conducted through conduit 104 into pretreament stage A in the bottom of vessel 100. Product gas is conducted through conduit 106 to pretreatment stage A of pretreater vessel 100. This process demonstrates one modification within the broad concept of this invention whereby the product gas employed to pretreat the coal is a portion of the purified product gas which has passed through the water gas shift reactor 108 and the carbon dioxide scrubber 110 and is passed through a pump or booster 112 which raises the pressure of the product gas used for pretreatment of the coal to a pressure in excess of 50 atmospheres to permit feeding of the pretreatment products from pretreater vessel 100 directly into the gasification vessel upper portion 18.

The coal treated in pretreater 100 is maintained in a fluidized state by the product gas introduced through conduit 106 and ascends from lower to higher pretreatment stages A through E within pretreater vessel 100 with the temperature and residence time of the coal in each individual pretreater stage A through E controlled to prevent softening and agglomeration of the coal. The temperature in each individual pretreatment stage A through E of pretreater 100 is controlled further by the addition, to selected pretreater stages, of a cold feed gas obtained from the water gas shift reactor 108 and conducted through conduit 114 to the selected individual pretreatment stages.

To raise the untreated coal fed into pretreatment stage A to the necessary initial temperature, during process start-up, a separate preheater (not shown in the drawing) is provided. During the process, the coal fed to pretreatment stage A is raised to the necessary initial temperature by introducing into stage A, through conduit 116, a portion of the pretreated solids from pretreatment stage E, downstream of stage A. Adjustment of the temperature in any particular pretreatment stage can be effected by recycling pretreated solids from any selected successive pretreatment stage downstream of the stage in which temperature adjustment is desired.

Examples of suitable temperatures and residence times for use with is process are presented in Table B, which presents data from an exemplary process in which 30 standard cubic feet of product gas might be used per pound of highly agglomerating feed coal.

TABLE B

| Compartment: | Temp., F. | Residence time, min. | Heating rate, degree F./min. |
|---|---|---|---|
| A | 720 | 10 |  |
| B | 750 | 10 | 3 |
| C | 790 | 10 | 4 |
| D | 840 | 12.5 | 4 |
| E | 910 | 14 | 5 |

The pretreated coal and other products of the pretreatment stage entrained in the product gas are conducted from pretreater 100 through conduit 118 to the second gasification stage in the upper portion 18 of gasifier 20 where the process proceeds to completion in a manner similar to that described for the process illustrated in FIG. 1.

PRETREATMENT OF COAL-OIL SUSPENSION

Figure 5:
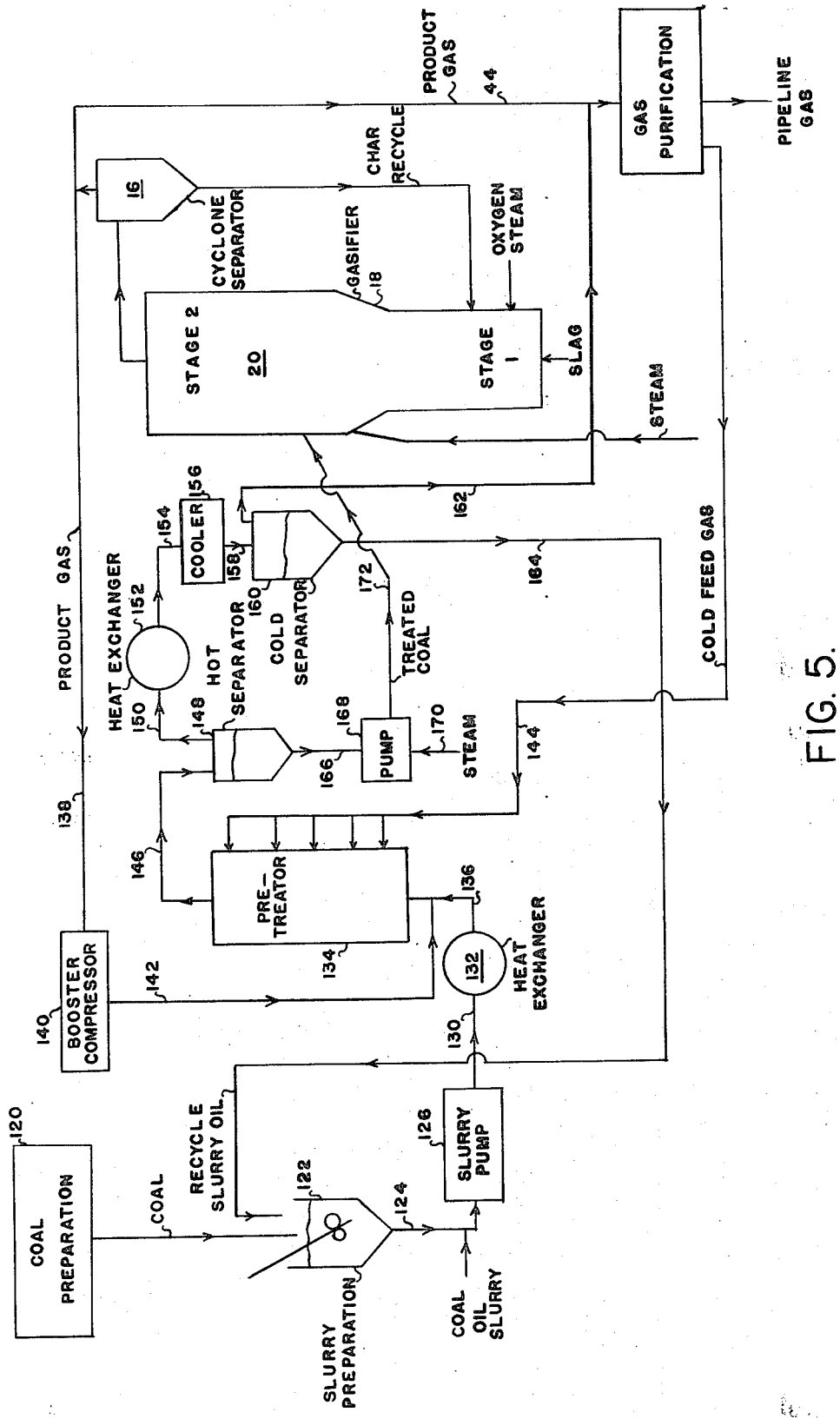
FIG. 5 is a diagrammatic illustration of apparatus for use with the process of this invention wherein untreated coal is mixed with oil to form a slurry. The oil is recycled from the process and pretreated with the coal in multiple stages by reaction with product gas.

FIG. 5 illustrates a process of this invention adapted for use in the pretreatment of coal in the liquid phase. Coal from preparation plant 120 is fed into a slurry preparation unit 122 and mixed therein with recycled slurry oil in a weight ratio of about 1.0 coal to 1.25 recycled slurry oil.

The resulting coal-oil slurry is conducted through conduit 124 to slurry pump 126 where the slurry pressure is increased in excess of 50 atmospheres. The slurry is then passed through conduit 130 to heat exchanger 132 where the temperature of the coal-oil slurry is raised to the entry temperature of pretreater vessel 134. The heated coal-oil slurry is conducted through conduit 136 to pretreater vessel 134 and mixes in conduit 136 with product gas which is withdrawn from cyclone separator 16 through conduit 138 to booster compressor 140 and passed through conduit 142 to conduit 136. Compressor 140 raises the pressure of product gas to about 50 atmospheres or more to assure entry of product gas into conduit 136 when mixing with the slurry.

Pretreater vessel 134 is shown in the drawing as a multiple stage pretreater similar to pretreater 100 shown in FIG. 4. With a particular composition of coal-oil slurry, a single stage, or two-stage, pretreater unit could be employed. Reaction temperatures in pretreater vessel 134 are controlled by the introduction of cold feed gas into the vessel 134 through conduit 144. The cold feed gas is obtained from the water gas shift reaction in the gas purification unit.

The coal-oil slurry enters pretreater vessel 134 at a temperature, for example, of approximately 795° F. and increases in temperature, because of the exothermic reactions in the reactor, to exit from pretreater 134 at a temperature, for example, of approximately 900° F. The pretreater product is conducted through conduit 146 to a hot separator 148 where volatilized gases and vapors are separated from the liquefied coal at a temperature of approximately 850° F. The preheated volatilized gases and vapors separated in hot separator 148 are withdrawn through conduit 150 and pass to heat exchanger 152 for cooling and pass thereafter through conduit 154 to cooler 156 for further cooling before the pretreated and cooled gases and vapors are fed through conduit 158 to cold separator 160. Volatilized materials remaining as gases and vapors in cold separator 160 are conducted through conduit 162 to the product gas conduit 44 and the gas purification units. The liquid slurry oil condensed in cold separator 160 from the pretreated gases and vapors is recycled through conduit 164 to slurry preparation unit 122 for further use in the process.

The liquid separated in hot separator 148 contains liquefied coal, residual coal and ash and is fed through conduit 166 to pump 168 and is mixed therein with steam introduced through conduit 170 at a temperature of approximately 1,000° F. for delivery through conduit 172 to the second gasification stage in gasifier vessel 18 for reaction with synthesis gas from the first gasification stage.

According to the provisions of the patent statutes, I have explained the principle, preferred construction and mode of operation of my invention and have illustrated and described what I now consider to represent its best embodiments. However, I desire to have it understood that, within the scope of the appended claims, the invention may be practiced otherwise than as specifically illustrated and described.

I claim:

1. A process for the gasification of a pretreated coal comprising,
passing a partially gasified recycle char through a first gasification zone while reacting said char with superheated steam and oxygen at a temperature of at least 2,500° F. and at a pressure of at least 50 atmospheres to yield a first zone synthesis gas comprising hydrogen and oxides of carbon,
passing through a second gasification zone the coal pretreated as described below, superheated steam and said synthesis gas for reaction in said second zone at a temperature of at least 1,600° F. and at a pressure of at least 50 atmospheres to yield a second zone product comprising partially gasified char entrained in a second zone product gas comprising methane, hydrogen and oxides of carbon,
withdrawing and separating the product gas and the partially gasified char,
recycling at least part of the separated char to the first gasification zone,
introducing coal into a pretreating zone prior to introducing said coal into the second gasification zone,
introducing a portion of said second zone product gas into the pretreating zone,
reacting the coal introduced into said pretreating zone with the second zone product gas at a temperature of between about 600° F. and 950° F. to yield a pretreated product comprising pretreated coal and gases,
introducing said pretreated product and superheated steam into the second gasification zone for reaction with synthesis gas from the first zone, and
purifying and methanating the remaining portion of the second zone product gas not recycled to said pretreating zone to yield a final product gas comprising methane in a concentration of at least 70% by volume.

2. A process for the gasification of a pretreated coal as set forth in claim 1 which includes,
maintaining the coal in the pretreating zone as a fluidized bed, and
introducing recycled product gas into said pretreating zone as a fluidizing gas.

3. A process for the gasification of a pretreated coal as set forth in claim 1 which includes,
maintaining the coal in the pretreating zone for a period of time between about 5 and 60 minutes.

4. A process for the gasification of a pretreated coal as set forth in claim 1 which includes,
maintaining hydrogen in the recycled product gas in the pretreating zone at a partial pressure of from approximately 300 p.s.i.g. to approximately 1,000 p.s.i.g.

5. A process for the gasification of a pretreated coal as set forth in claim 1 which includes,
first and second pretreatment stages in said pretreating zone,
untreated coal is introduced into said first pretreatment stage and reacted with char laden product gas recycled from the second gasification zone, a portion of the first stage pretreatment char is withdrawn therefrom and mixed with the untreated coal prior to its introduction into the first stage, additional first stage char is withdrawn from said stage and introduced into said second pretreatment stage for reaction therein, at a temperature higher than the temperature in the first stage, with char laden product gas recycled from the second gasification zone, mixing the char laden product gas, prior to its introduction into the second pretreatment stage, with cold gas obtained from a water gas shift reaction performed in the purification of the product gas from the second gasification zone, maintaining residence times and temperatures in each pretreatment stage to prevent substantially both softening and agglomeration of the coal, withdrawing from the first and second pretreatment stages the volatilized gases, vapors and liquids produced therein and mixing said volatilized materials with steam, withdrawing pretreated char from the second pretreatment stage and mixing said char with said mixture of steam and volatilized materials, and introducing the mixture of steam, pretreated second stage char and volatilized materials into the second gasification zone for reaction with synthesis gas from the first gasification zone.

6. A process for the gasification of a pretreated coal as set forth in claim 5 which includes, maintaining pretreated first stage char and coal in the first pretreatment stage at a temperature of approximately 730° F. for a residence time of approximately 20 minutes, and maintaining the char in the second pretreatment stage at a temperature of approximately 810° F. for a residence time of approximately 20 minutes.

7. A process for the gasification of a pretreated coal as set forth in claim 1 which includes, separating the volatilized gases and vapors in the pretreated product from the pretreated coal, condensing those constituents of the volatilized gases and vapors that are liquids at ambient temperature, returning to the process steam those volatilized materials remaining as gases and vapors after condensation at ambient temperature, and selectively introducing said condensed liquids into the second gasification zone with the pretreated coal and steam.

8. A process for the gasification of a pretreated coal as set forth in claim 1 wherein at least 50% by volume of the gases reacted in the pretreatment zone have a hydrogen content of at least 80% by volume.

9. A process for the gasification of a pretreated coal as set forth in claim 1 which includes, separating the pretreating zone into a plurality of stages with each stage maintained at a pressure higher than the pressure of the next succeeding stage and higher than the pressure in the second gasification zone, purifying the second gasification zone product gas at least partly by passing said gas through a water gas shift reaction and carbon dioxide and hydrogen sulfide removal reactions to yield a purified gas, recycling a portion of the purified gas to the pretreating zone for reaction therein with coal introduced into said zone, increasing the temperature gradually at successive stages of the pretreating zone within the temperature range of from 600° F. to 950° F. while maintaining a temperature and residence time for the coal in each stage to prevent substantially softening and agglomeration of said coal, withdrawing a cold feed gas from the products of the water gas shift reaction and introducing selected portions of said feed gas into various stages of the pretreating zone to control the temperature in each such stage, mixing coal in one stage of the pretreating zone with pretreating coal recycled from a succeeding stage in said zone to raise the temperature in the upstream stage, withdrawing from the last stage of the pretreating zone a pretreated product comprising pretreated coal and gases and vapors volatilized therefrom, mixing said pretreated product with steam and introducing the mixture into the second gasification zone for reaction with synthesis gas from the first zone.

10. A process for the gasification of a pretreated coal as set forth in claim 9 which includes, the pretreating zone including at least three stages, the heating rate in each stage maintained at not more than five degrees per minute, the temperature throughout the pretreating zone being maintained within the range of from 700° F. to 925° F., and pretreated coal from the last stage is recycled to the first stage to raise the temperature of the coal therein to more than 700° F.

11. A process for the gasification of a pretreated coal as set forth in claim 1 which includes, preparing a slurry of coal and recycled oil in a mixture ratio of about one part coal to 125 parts oil, preheating said slurry and introducing the slurry into the pretreating zone for reaction therein with recycled product gas from the second gasification zone, controlling and maintaining gradual temperature increase within the pretreating zone by introducing at preselected stages of said zone a cold feed gas withdrawn from the product gas purification reactions of the process steam, withdrawing from the pretreating zone a pretreated product comprising coal, volatilized gases and vapors and liquids, separating hot liquids and coal from the pretreated product and introducing said liquids and coal, with steam, into the second gasification zone, cooling the hot gases and vapors of the pretreated product and separating resulting condensed liquids from remaining cool gases and vapors, purifying and methanating the cool gases and vapors, and recycling the cool condensed liquid for mixing in a slurry with untreated coal.

12. A process for the gasification of a pretreated coal as set forth in claim 11 which includes, increasing the temperature in the pretreating zone from approximately 790° F. to approximately 900° F., and separating the hot pretreated products at a temperature of about 850° F.

References Cited

UNITED STATES PATENTS

| 3,254,976 | 6/1966 | Wolf et al. | 48—197 R X |
| 3,607,156 | 9/1971 | Schlinger et al. | 48—197 R X |
| 2,751,287 | 6/1956 | Donath | 48—197 R X |

OTHER REFERENCES

Donath et al. Computer Study of Stage 2 Reactions in The BCR Two-Stage Super-Pressure Coal Gasification Process, American Chemical Soc., Div. of Fuel Chemistry, Chicago meeting, pp. 333–347 (September 1967).

JOSEPH SCOVRONEK, Primary Examiner

U.S. Cl. X.R.

48—200, 206, 210

UNITED STATES PATENT OFFICE
CERTIFICATE OF CORRECTION

Patent No. 3,817,723     Dated June 18, 1974

Inventor(s) Ernest E. Donath

It is certified that error appears in the above-identified patent and that said Letters Patent are hereby corrected as shown below:

In the Specification:

| | |
|---|---|
| Column 4, line 21 | Before "than", delete 'les' and insert --less--; |
| Column 6, line 23 | After "condenser", delete '72' and insert --82--; |
| Column 6, line 40 | After "into", delete 'pretreament' and insert --pretreatment--; |
| Column 7, line 5 | After "with", delete 'is' and insert --this--; |
| Column 10, line 29 | After "to", delete '125' and insert --1.25--. |

Signed and sealed this 5th day of November 1974.

(SEAL)
Attest:

McCOY M. GIBSON JR.
Attesting Officer

C. MARSHALL DANN
Commissioner of Patents